| United States Patent [19] | [11] | 4,113,705 |
|---|---|---|
| Bock et al. | [45] | Sep. 12, 1978 |

[54] TRIISOCYANATES USEFUL FOR THE PRODUCTION OF POLYURETHANE RESINS

[75] Inventors: Manfred Bock, Leverkusen; Josef Pedain, Cologne; Walter Uerdingen, Bergisch-Gladbach, all of Germany

[73] Assignee: Bayer Aktiengesellschaft, Leverkusen, Germany

[21] Appl. No.: 778,631

[22] Filed: Mar. 17, 1977

[30] Foreign Application Priority Data

Apr. 2, 1976 [DE] Fed. Rep. of Germany ....... 2614243

[51] Int. Cl.² ................. C07C 119/045; C08G 18/75
[52] U.S. Cl. ........................ 260/859 R; 260/31.2 N; 260/31.6; 260/32.8 N; 260/33.6 UB; 260/33.8 UB; 260/40 TN; 260/453 A; 260/453 PH; 260/464; 260/563 R; 521/155; 528/44

[58] Field of Search ................. 260/453 A, 77.5 AT, 260/75 NT

[56] References Cited

U.S. PATENT DOCUMENTS

| 3,401,190 | 9/1968 | Schmitt et al. ................. 260/453 A |
| 3,551,469 | 12/1970 | Weyland et al. ............... 260/453 A |
| 3,584,045 | 6/1971 | Feldman et al. ............... 260/453 A |
| 4,045,462 | 8/1977 | Bock et al. .................... 260/453 AP |

*Primary Examiner*—Dolph H. Torrence
*Attorney, Agent, or Firm*—Gene Harsh; Lawrence S. Pope; Frederick H. Colen

[57] ABSTRACT

This invention relates to new liquid cycloaliphatic triisocyanates and to their use as isocyanate components for the production of polyurethane resins by the known isocyanate polyaddition process.

7 Claims, No Drawings

TRIISOCYANATES USEFUL FOR THE PRODUCTION OF POLYURETHANE RESINS

BACKGROUND OF THE INVENTION

The new triisocyanates are particularly suitable for use as isocyanate components in low solvent, two-component polyurethane lacquers which are lightfast. Low solvent or solvent-free, lightfast two-component polyurethane lacquers of this kind have been described, for example, in German Auslegeschrift No. 2,304,893, British Pat. No. 1,402,658 or U.S. application Ser. No. 616,108 filed on Sept. 23, 1975. The lacquer systems described there have considerable advantages compared with the prior art systems described in the same document. However, the polyisocyanates with an isocyanate functionality greater than 2 which are described as particularly suitable in this prior publication still have high viscosities, being in the region of about 1000 to 2500 cP/20° C., so that it is essential to use relatively large quantities of reactive diluents in the lacquer systems according to German Auslegeschrift No. 2,304,893 in order to obtain sufficiently low viscosities for spraying. The cycloaliphatic diisocyanates also mentioned in German Auslegeschrift No. 2,304,893 are of only limited usefulness in this field of application because of their lower isocyanate functionality and doubtful physiological properties.

It was, therefore, an object of the present invention to provide new polyisocyanates which would contain aliphatic isocyanate groups and have an isocyanate functionality greater than 2 and a viscosity below about 200 cP/20° C. Furthermore, the new isocyanates should preferably have isocyanate groups attached to primary carbon atoms so that they would be sufficiently reactive with compounds containing isocyanate-reactive groups. The new isocyanates should also have a low vapor pressure and be practically odorless at room temperature.

This problem was substantially solved by preparing the new triisocyanates described below. These new triisocyanates are particularly valuable starting materials for the production of polyurethane resins, in particular as isocyanate components in two-component polyurethane lacquers.

SUMMARY OF THE INVENTION

The present invention thus relates to triisocyanates of the formula

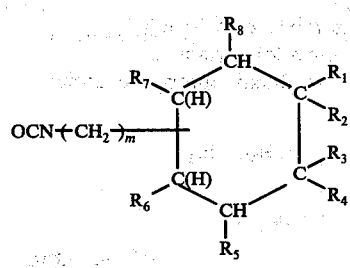

in which $R_1$, $R_2$, $R_3$ and $R_4$, which may be the same or different, represent hydrogen, a methyl group or the group —$(CH_2)_n$—NCO where $n$ represents an integer of from 1 to 3 and two of the groups represented by $R_1$, $R_2$, $R_3$ and $R_4$ are —$(CH_2)_n$—NCO groups; $m$ represents 0, 1 or 2 and $R_5$, $R_6$, $R_7$ and $R_8$, which may be the same or different, represent hydrogen or a methyl group, the total number of methyl groups represented by $R_5$, $R_6$, $R_7$ and $R_8$ being limited to a maximum of 2.

The present invention also relates to a process for the preparation of such triisocyanates, characterized in that compounds of the formula

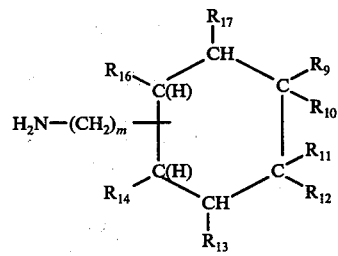

are subjected to phosgenation reactions known per se. In the above formula, $R_9$, $R_{10}$, $R_{11}$ and $R_{12}$ which may be the same or different, represent hydrogen, a methyl group or the group —$(CH_2)_n$—$NH_2$ where $n$ represents an integer of from 1 to 3 and two of the groups represented by $R_9$, $R_{10}$, $R_{11}$ and $R_{12}$ are —$(CH_2)_n$—$NH_2$ groups; $m$ represents 0, 1 or 2 and $R_{13}$, $R_{14}$, $R_{16}$ and $R_{17}$, which may be the same or different, represent hydrogen or a methyl group, the total number of methyl groups represented by $R_{13}$, $R_{14}$, $R_{16}$ and $R_{17}$ being limited to a maximum of 2.

Lastly, the present invention relates to the use of these new triisocyanates as isocyanate components in the production of polyurethane resins by the isocyanate polyaddition process.

DETAILED DESCRIPTION OF THE INVENTION

The triamines of formula (I)

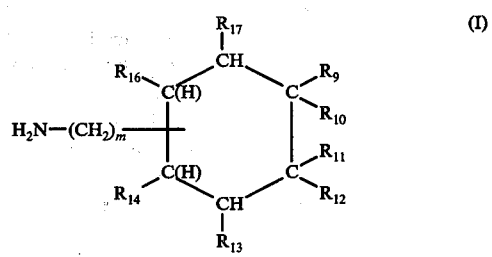

in which $R_9$, $R_{10}$, $R_{11}$, $R_{12}$, $R_{13}$, $R_{14}$, $R_{16}$, $R_{17}$ and $m$ have the meaning specified above, which are used in the process according to the invention for preparing the triisocyanates according to the invention, are obtainable by a hydrogenation reaction of compounds of the general formula (II)

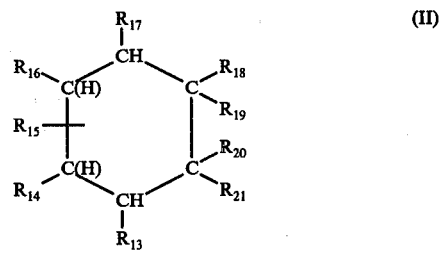

in the presence of ammonia.

In the above formula (II), $R_{18}$, $R_{19}$, $R_{20}$ and $R_{21}$, which may be the same or different, represent hydrogen, a methyl group or —(CH$_2$)$_r$—CN where r represents 0, 1 or 2 and two of the groups represented by R$_{18}$, R$_{19}$, R$_{20}$ and R$_{21}$ are —(CH$_2$)$_r$—CN groups, R$_{15}$ represents —CN, —CH$_2$—CN, —CHO or —NH$_2$ and R$_{13}$, R$_{14}$, R$_{16}$ and R$_{17}$ may be the same or different and represent hydrogen or a methyl group, the total number of methyl groups represented by R$_{13}$, R$_{14}$, R$_{16}$ and R$_{17}$ being limited to a maximum of 2.

In this hydrogenation reaction, the nitrile groups present are reduced to the corresponding amino groups. Any formyl groups present are at the same time reductively aminated to the corresponding amino groups. The catalytic hydrogenation of nitrile groups and possible reductive amination of the aldehyde function are carried out simultaneously. Reduction is carried out in the presence of from about 2 to 30 mol of ammonia per mol of compound (II), in particular from about 3 to 15 mol of ammonia per mol of compound II, at a temperature of from about 30° to 180° C. and a hydrogen pressure of about 5 to 200 bar, in particular at about 60° to 150° C. and about 30 to 150 bar. Catalysts used for the reduction are preferably metals having atomic numbers 23 to 30 and 42 to 46, for example catalysts containing nickel and/or cobalt such as Raney nickel and/or Raney cobalt.

In a preferred embodiment of the invention, Raney cobalt or cobalt catalysts are used with acidic carriers such as silicic acid. In one embodiment, catalytic reductive amination of the formyl group and simultaneous hydrogenation of the nitrile groups is carried out in the presence of catalytic quantities of acids or ammonium salts such as acetic acid, propionic acid, trifluoroacetic acid, ammonium chloride or ammonium phosphate. Hydrogenation may be carried out in a solvent. Suitable solvents include alcohols such as methanol, ethanol, isopropanol, cyclohexanol, ethyleneglycol, ethyleneglycol monomethylether, ethers such as ethyleneglycol-monomethylether, ethers such as ethyleneglycoldimethylether or diethylether, cyclic ethers such as tetrahydrofuran and dioxane, hydrocarbons such as cyclohexane, benzene, toluene, xylene and water. It may be advantageous to use a solvent mixture. In the case of formyl nitrile prepared by hydroformylation, the solvent used for hydroformylation may also be used for hydrogenation. Tetrahydrofuran and toluene are preferred solvents. It is a particular advantage of the process that catalytic reduction can be carried out in the same solvent as that in which the nitrile compound was prepared.

This reduction or reductive amination yields the starting products (I) according to the invention.

Particularly preferred representatives of the starting products according to the invention include, for example, the isomeric mixtures obtainable from cyano compounds (II), e.g. the isomeric mixture of 1,4-bis-(aminomethyl)-2-(3-aminopropyl)-cyclohexane and 1,3bis-(aminomethyl)-4-(3-aminopropyl)-cyclohexane (VI)

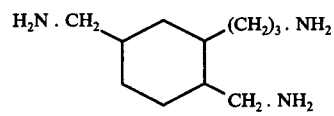

(VI);

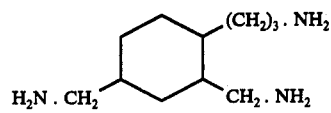

the isomeric mixture of 1,4-bis-(aminomethyl)-1-(3-aminopropyl)-cyclohexane and 1,3-bis-(aminomethyl)-1-(3-aminopropyl)-cyclohexane (VII)

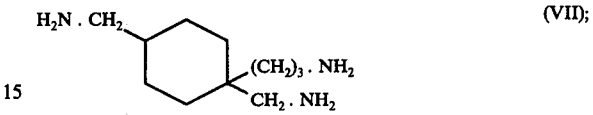

(VII);

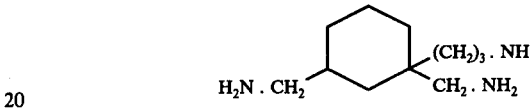

the isomeric mixture of 1-aminomethyl-2-(3-aminopropyl)-4-(2-aminoethyl)-cyclohexane and 1-aminomethyl-2-(3-aminopropyl)-5-(2-aminoethyl)-cyclohexane (VIII)

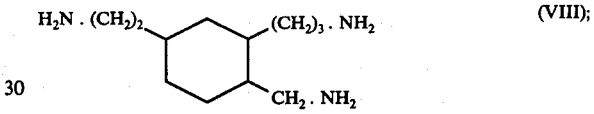

(VIII);

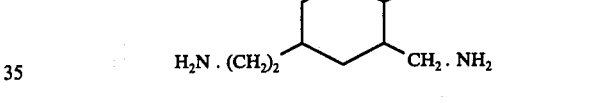

the isomeric mixture of 1-aminomethyl-1-(3-aminopropyl)-4-(2-aminoethyl)-cyclohexane and 1-aminomethyl-1-(3-aminopropyl)-3-(2-aminoethyl)-cyclohexane (IX)

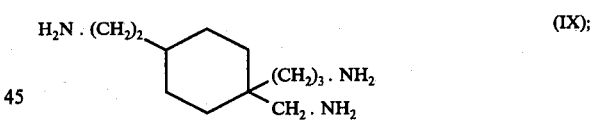

(IX);

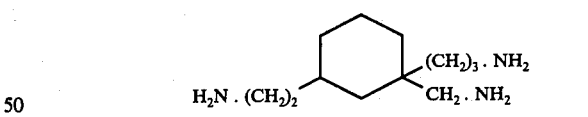

the isomeric mixture of 1-methyl-3-(3-aminopropyl)-4-aminomethyl-cyclohexylamine and 1-methyl-3-aminomethyl-4-(3-aminopropyl)-cyclohexylamine (X)

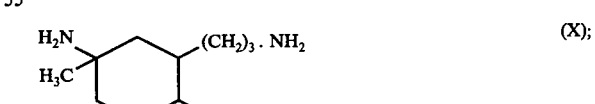

(X);

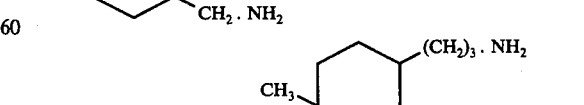

the isomeric mixture of 1-methyl-4-aminomethyl-4-(3-aminopropyl)-cyclohexylamine and 1-methyl-3-aminomethyl-3-(3-aminopropyl)-cyclohexylamine (XI)

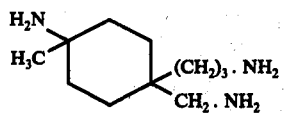 (XI);

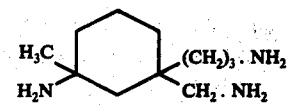

and the isomeric mixture of 1-methyl-1,4-bis-(aminomethyl)-4-(3-aminopropyl)-cyclohexane, 1-methyl-2,5-bis-(aminomethyl)-5-(3-aminopropyl)-cyclohexane, 1-methyl-2,4-bis-(aminomethyl)-4-(3-aminopropyl)-cyclohexane, and 1-methyl-1,3-bis-(aminomethyl)-3-(3-aminopropyl)-cyclohexane (XII)

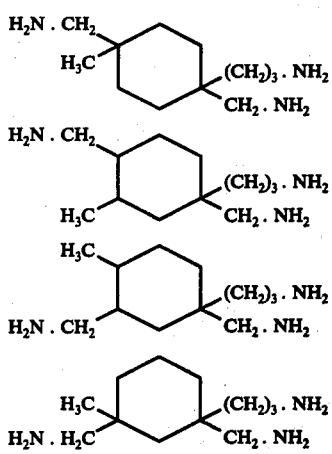 (XII);

The intermediate products (II) are obtained according to the reaction scheme indicated below. In these formulae, $R_{13}$, $R_{14}$, $R_{16}$, $R_{17}$, $R_{18}$, $R_{19}$, $R_{20}$ and $R_{21}$ have the meanings indicated above.

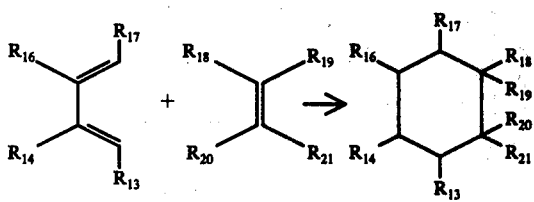

(III)    (IV)    (V)

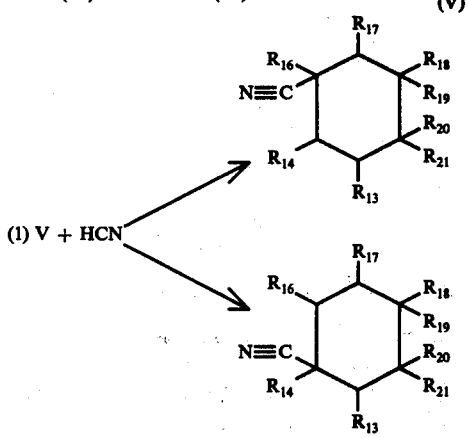

(1) V + HCN

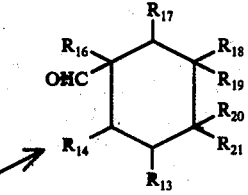 (IIb)

(2) V + CO/H$_2$

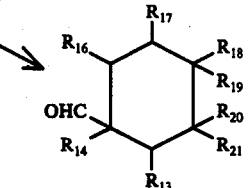 (IIc)

(3) V + CH$_3$.CN

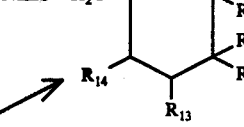

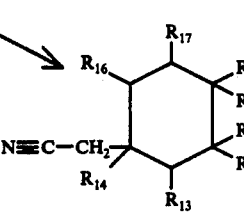 (IId)

(4) V + HCN/H$_2$SO$_4$

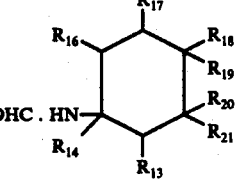

In a first reaction step, a singly unsaturated intermediate product (V) is first prepared from a diene (III) and a dicyanoalkene (IV) by the known Diels-Alder reaction. This first reaction is preferably carried out as follows:

The diene is reacted with the dienophil in a stirrer autoclave at autogenous pressure and at temperatures of between about 20° and 200° C., preferably between about 120° and 170° C. The reaction can be improved in known manner by the addition of suitable catalysts. Inert solvents which can be removed after the reaction by distillation to isolate the Diels-Alder product may also be used.

Intermediate product (II) is obtained by reaction of the intermediate product (V) with hydrocyanic acid, carbon monoxide/hydrogen, acetonitrile or sulphuric acid/hydrocyanic acid (Ritter reaction).

Reaction of the intermediate product (V) with hydrocyanic acid results in the isomeric mixture (II a) in accordance with the above equation (1). This reaction (1) is generally carried out as follows:

The unsaturated intermediate product (V) is reacted with hydrocyanic acid, preferably twice its equivalent quantity, in an inert solvent such as tetrahydrofuran or toluene at a temperature of between about 50° and 150° C., preferably between about 100° and 120° C. at autogenous pressure. Numerous complex compounds are suitable for use as catalyst, particularly complexes of the 8th sub-Group of the Periodic System of Elements such as $Ni[P(OC_6H_5)_4]_4$ together with zinc chloride and triphenylphosphite.

Reaction of the intermediate product (V) with carbon monoxide/hydrogen according to above equation (2) results in the isomeric mixtures (II b). This reaction is generally carried out as follows:

The above mentioned cyclohexene dinitriles together with a solvent which is inert under the conditions of hydroformylation, such as xylene, toluene, benzene, methylcyclohexane, cyclohexane, dioxane or tetrahydrofuran, are introduced into a high pressure reaction vessel together with a hydroformylating catalyst such as a rhodium or cobalt compound, in particular a rhodium complex, which may contain carbon monoxide, tertiary organic phoshines or phosphites and halogen atoms as ligands. Carbon monoxide and hydrogen are forced in under pressure at a ratio of between about 0.5:1 and 2:1, and the reaction is carried out at a pressure of about 50 to 300 bar and a temperature of from about 120° to 190° C., preferably from about 140° to 180° C., for a period of less than about 6 hours. After termination of the reaction, the solvents and hydroformylation products are removed from catalyst-containing residue by known methods, e.g. by distillation, optionally at reduced pressure. The catalyst-containing residue obtained after distillation can be used for subsequent reactions or roasted to recover the catalyst metal. Hydroformylation of cyclohexene dinitriles may also be carried out continuously in a suitable apparatus.

Reaction of the intermediate product (V) with acetonitrile according to equation (3) results in the isomeric mixtures (II c). This reaction is generally carried out as follows:

The olefin (V) is put under pressure at elevated temperature with a starter in acetonitrile or a mixture of acetonitrile and solvents to effect radical addition of acetonitrile. The acetonitrile is present in a about 1 to 10 times molar excess. The autogenic pressure established in the reactor depends on the temperatures, which may lie between about 50° C. and 180° C. The starters used may be any conventional radical forming compounds, in particular tertiary butyl peroxide at 145° C. The reaction may also be designed to proceed continuously.

Reaction of the intermediate product (V) with hydrocyanic acid/sulphuric acid followed by hydrolysis according to (4) by the known Ritter reaction and as described, for example, in German Offenlegungsschrift No. 1,965,004 which corresponds to U.S. Pat. No. 3,787,575 results in the isomeric mixtures (II d). This reaction is generally carried out as follows:

The intermediate product (V) is introduced dropwise into aqueous, dilute about 50 to 96%, preferably about 60 to 70%, sulphuric acid to which an excess of hydrocyanic acid has been added. After prolonged heating of the hydrocyanic acid under reflux, the reaction mixture is taken up in water and adjusted to about pH 4. This causes separation of the formamido compound (see equation 4) which is then hydrolyzed in a weakly acid, aqueous medium to yield the isomeric mixture (II d).

For this reaction it is particularly suitable to use those intermediate products (V) in which the —C=C— double bond carries a methyl substituent ($R_{15}$ or $R_{16}$ IS—$CH_3$).

The following compounds may be used as diene component (III) for preparation of the intermediate compound (V): Butadiene, 1-methylbutadiene, 2-methylbutadiene and 2,3-dimethylbutadiene.

The following are examples of dicyanoalkenes which may be used as dienophilic partners: Maleic acid dinitrile, 2,3-dimethyl-maleic acid dinitrile, fumaric acid dinitrile, glutaconic acid dinitrile, α-methylene-glutaric acid dinitrile, α-methyl-glutaconic acid dinitrile, β-methylene-glutaric acid dinitrile, β-methylglutaconic acid dinitrile, 2-ethylidene-glutaric acid dinitrile, 2-isopropylidene-glutaric acid dinitrile, dicrotonic acid dinitrile, 1,4-dicyanobutene-2 and 1,4-dicyanobutene-1.

The dicycloalkenes and dienes mentioned above can be used for forming the intermediate compounds (V) which are reacted to form the intermediate products (IIa–IId) suitable for the process according to the invention. The following compounds, in each case present as stereoisomeric mixtures, are examples of such products (IIa–IId):

1,4(or 1,5)-Dicyano-2-(2-cyanoethyl)-cyclohexane;
1-cyano-2-(2-cyanoethyl)-4(or 5)-formyl-cyclohexane;
1-cyano-2-(2-cyanoethyl)-4(or 5)-cyanomethyl-cyclohexane;
1-cyano-2-(2-cyanoethyl)-4(or 5)-methyl-4-(or 5)-cyanocyclohexane;
1-cyano-2-(2-cyanoethyl)-4(or 5)-methyl-4(or 5)-formylcyclohexane;
1-cyano-2-(2-cyanoethyl)-4(or 5)-methyl-4(or 5)-cyanomethylcyclohexane;
1-methyl-3(or 4)-cyano-3(or 4)-(2-cyanoethyl)-cyclohexylamine;
1,3(or 1,4)-dicyano-1-(2-cyanoethyl)-cyclohexane;
1-cyano-1-(2-cyanoethyl)-3(or 4)-formyl-cyclohexane;
1-cyano-2-(2-cyanoethyl)-3(or 4)-cyanomethyl-cyclohexane;
1-cyano-1-(2-cyanoethyl)-3(or 4)-methyl-3(or 4)-cyanocyclohexane;
1-cyano-1-(2-cyanoethyl)-3(or 4)-methyl-3(or 4)-formyl-cyclohexane;
1-cyano-1-(2-cyanoethyl)-3(or 4)-methyl-3(or 4)-cyanomethyl-cyclohexane;
1,2-di-cyanomethyl-4(or 5)-cyano-cyclohexane;
1,2-di-cycanomethyl-4(or 5)-formyl-cyclohexane;
1,2,4(or 1,2,5)-tris-cyanomethyl-cyclohexane;
1,2-di-cyanomethyl-3(or 6)-methyl-4(or 5)-cyano-cyclohexane;
1,2-di-cyanomethyl-3(or 6)-methyl-4(or 5)-formyl-cyclohexane and
1,2,4(or 1,2,5)-tris-cyanomethyl-3(or 6)-methyl-cyclohexane.

In the process according to the invention, the starting materials (I) used according to the invention are converted into the corresponding triisocyanates according to the invention by a phosgenating reaction in known manner. This is generally carried out as follows:

Phosgenation of the cycloaliphatic triamines is preferably carried out via the carbamic acid salt stage by introducing carbon dioxide into a heated solution of triamine, preferably at about 100° to 120° C., until the reaction is completed. The reaction mixture is then cooled and phosgene is incorporated in the suspension by condensation by the process of "cold-hot phosgenation" at between about −10° C. and 0° C. The reaction mixture is then heated to the boiling point of the solvent while phosgene continues to be introduced and the reaction is continued until a clear solution is obtained. The triisocyanate can be isolated from this solution by distillation. Suitable solvents for the phosgenation reaction include halogenated alkanes such as tetrachloromethane, tetrachloroethane or perchlorethylene and cycloalkanes such as cyclohexane and halogenated aromatic solvents, particularly chlorobenzene.

Phosgenation may also be carried out without going through the stage of the carbamic acid salts. In that case, the triamine is introduced into liquid phosgene and the reaction is completed at boiling with further addition of phosgene.

Proceeding along this general method, one obtains from triamines (VI)–(XII) the following corresponding cyclic triisocyanates (XIII) to (XIX) which are preferred according to the invention:

1-Isocyanatomethyl-2-(3-isocyanatopropyl)-4(or 5)-isocyanatomethyl-cyclohexane in the form of an isomeric mixture (XIII)

(XIII);

1-isocyanatomethyl-1-(3-isocyanatopropyl)-3(or 4)-isocyanatomethyl-cyclohexane in the form of an isomeric mixture (XIV)

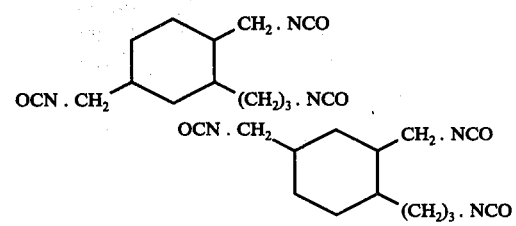

(XIV);

1-isocyanatomethyl-2(3-isocyanatopropyl)-4(or 5)-2-isocyanatoethyl)-cyclohexane in the form of an isomeric mixture (XV)

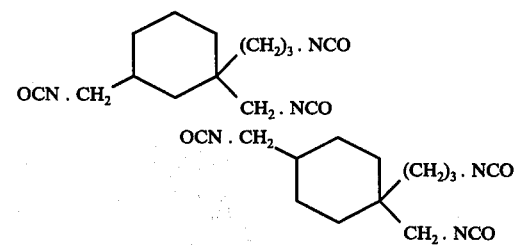

(XV);

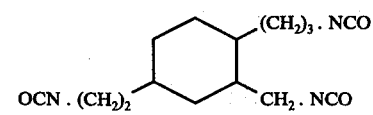

-continued

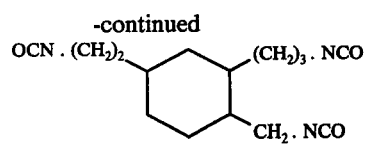

1-isocyanatomethyl-1-(3-isocyanatopropyl)-3(or 4)-(2-isocyanatoethyl)-cyclohexane in the form of an isomeric mixture (XVI)

(XVI);

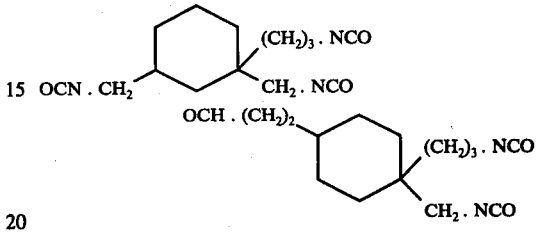

1-isocyanatomethyl-2-(3-isocyanatopropyl)-4(or 5)-isocyanato-4(or 5)-methyl-cyclohexane as isomeric mixture (XVII)

(XVII);

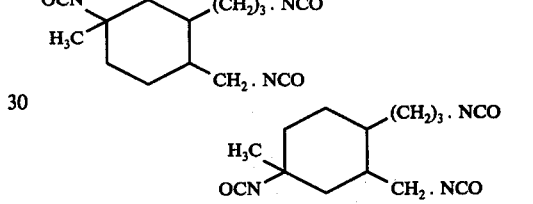

1-isocyanatomethyl-1-(3-isocyanatopropyl)-3(or 4)-isocyanato-3(or 4)-methyl-cyclohexane as isomeric mixture (XVIII)

(XVIII);

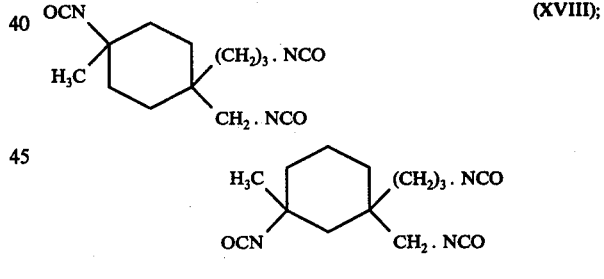

and 1-isocyanatomethyl-1-(3-isocyanatopropyl-3(or 4)-isocyanatomethyl-3(or 4)-methyl-cyclohexane as isomeric mixture (XIX)

(XIX)

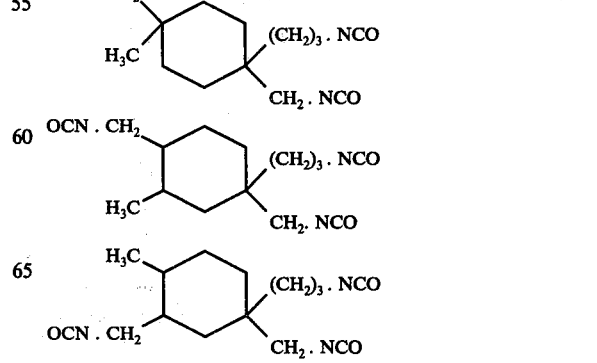

-continued

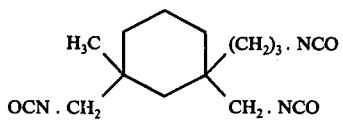

The polyisocyanates according to the invention afford numerous advantages over the polyisocyanates known in the art. They are completely odorless at room temperature and have no irritant effect whatever on the ocular mucous membranes. Since they have not been synthesized from low molecular weight diisocyanates, they contain no residue of diisocyanates with a high vapor pressure. At room temperature they are colorless and liquid and have a very low viscosity, which means that they can be sprayed without diluent even in the cold. They do not crystallize even at temperatures around freezing (0° C.) and form no precipitates when left to stand in the cold.

The polyisocyanates according to the invention are eminently suitable for the production of solvent-free and low solvent polyurethane two-component lacquers which have very low viscosities when ready for use and can, therefore, be applied without reactive diluents, using only a small quantity of solvent. The lacquers are completely odorless at room temperature and form very quick drying lacquer films which have excellent surface hardness, light fastness and weather resistance.

The triisocyanates according to the invention may, of course, also be made up into two-component polyurethane lacquers with larger quantities of solvents and, if desired, polyols may also be used as reactive diluents. Suitable solvents include, for example, esters and ketones such as methyl, ethyl, propyl and butyl acetate, ethyl glycol acetate, butyl diglycol acetate, methyl ethyl ketone, acetone and methyl isobutyl ketone. Hydrocarbons such as toluene, xylenes and chlorobenzenes are also suitable. It is particularly worth noting that the polyisocyanates according to the invention may be processed as mixtures with petroleum hydrocarbons such as mineral spirits boiling within the range of about 140° to 190° C. and aromatic hydrocarbons such as xylene without requiring the addition of polar solvents. The polyisocyanates according to the invention may also be used in a masked form as isocyanate components for producing stoving lacquers with an unlimited pot life. Suitable masking agents for this purpose include phenols such as phenol itself, cresols, isononylphenol, oximes such as butanone oxime, benzophenone oxime, lactams such as caprolactams, alcohols such as methanol, acetoacetic esters, malonic acid esters and mercaptans. Bisulphite adducts of the isocyanates according to the invention can also be used.

These blocked triisocyanates are obtained from the triisocyanates according to the invention by a method similar to the known method employed for preparing blocked polyisocyanates.

Suitable components for reaction with the polyisocyanates according to the invention or corresponding masked polyisocyanates include, for example, compounds generally with a molecular weight of from about 400 to 10,000 which contain at least two hydrogen atoms capable of reacting with isocyanates. Particularly suitable compounds of this kind, apart from compounds containing amino, thiol, or carboxyl groups, are polyhydroxyl compounds, in particular compounds having from 2 to 8 hydroxyl groups, especially those with a molecular weight of from about 800 to 10,000 and, preferably about 1000 to 6000, for example polyesters, polyethers, polythioethers, polyacetals, polycarbonates, polyester amides or the like having at least two, generally 2 to 8 and preferably 2 to 4 hydroxyl groups, of the kind known per se for the production of both homogeneous and cellular polyurethanes.

Suitable polyesters with hydroxyl groups include, for example, reaction products of polyhydric, preferably dihydric, alcohols to which trihydric alcohols may be added and polybasic, preferably dibasic carboxylic acids. Instead of using free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms and/or unsaturated. The following are given as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids optionally as mixtures with monomeric fatty acids, dimethyl terephthalate and terephthalic acid-bisglycol ester. Suitable polyhydric alcohols include e.g. ethylene glycol, propylene glycol-(1,2) and -(1,3), butylene glycol-(1,4) and -(2,3), hexanediol-(1,6), octanediol-(1,8), neopentylglycol, cyclohexane dimethanol (1,4-bis-hydroxymethylcyclohexane), 2-methyl-1,3-propanediol, 1,1-dimethylolpropane, glycerol, trimethylol-propane, hexane triol-(1,2,6), butanetriol-(1,2,4), trimethylolethane, pentaerythritol, quinitol, mannitol and sorbitol, methyl glycoside, diethyleneglycol, triethylene glycol, tetraethylene glycol, polyethylene glycols, dipropylene glycol, polypropylene glycols, butylene glycol and polybutylene glycols. The polyesters may contain a proportion of carboxyl end groups. Polyesters of lactones such as ε-caprolactone or hydroxycarboxylic acids such as ω-hydroxy-caproic acid may also be used.

Apart from these polyhydroxy polyesters, which are the particularly preferred reactants for the triisocyanates according to the invention, the known polyhydroxypolyethers of polyurethane chemistry are also preferred reactants for the new triisocyanates. Examples of such polyhydroxy polyethers include polyethers known per se which have at least 2, generally 2 to 8 and preferably 2 to 3 hydroxyl groups and can be prepared, for example, by the polymerization of epoxides such as ethylene oxide, propylene oxide, butylene oxide, tetrahydrofuran, styrene oxide or epichlorohydrin, either on their own, e.g. in the presence of boron trifluoride, or by chemical addition of these epoxides, either as mixtures or successively, to starting components with reactive hydrogen atoms such as alcohols or amines, e.g. water, ethylene glycol, propylene glycol-(1,3) or -(1,2), trimethylolpropane, 4,4'-dihydroxy-diphenylpropane, aniline, ammonia, ethanolamine or ethylene diamine. Sucrose polyethers as described e.g. in German Auslegeschriften Nos. 1,176,358 and 1,064,938 and U.S. Pat. Nos. 3,153,002 and 2,927,918 may also be used according to the invention. It is in many cases preferred to use polyethers which contain predominantly primary hydroxyl groups (up to about 90% by weight, based on all the hydroxyl groups in the polyether). Polyethers modified with vinyl polymers, for example the compounds obtained by polymerizing styrene or acrylonitrile in the presence of polyethers (U.S. Pat. Nos. 3,383,351; 3,304,273; 3,523,093 and 3,110,695 and German Pat. No. 1,152,536) are also suitable, as are polybutadienes with hydroxyl groups.

Hydroxyl containing polythioethers, polyacetals, polycarbonates, polyester amides and polyamides are also suitable.

Among the polythioethers may be particularly mentioned the condensation products obtained by reacting thiodiglycol on its own and/or with other glycols, dicarboxylic acids, formaldehyde, aminocarboxylic acids or aminoalcohols. The products obtained are polythio mixed ethers, polythioether esters or polythioether ester amides, depending on the cocomponents.

Suitable polyacetals include e.g. the compounds which can be prepared from glycols such as diethylene glycol, triethylene glycol, 4,4'-dioxethoxy-diphenyl-dimethylmethane or hexanediol and formaldehyde. Suitable polyacetals for the purpose of the invention may also be obtained by the polymerization of cyclic acetals.

Suitable polycarbonates with hydroxyl groups also include those known per se such as the polycarbonates obtained by the reaction of diols such as propanediol-(1,3), butanediol-(1,4) and/or hexanediol-(1,6), diethylene glycol, triethylene glycol or tetraethyleneglycol with diarylcarbonates, e.g. diphenylcarbonate or phosgene.

Among the polyester amides and polyamides may also be included e.g. the predominantly linear condensates obtained from polyvalent saturated and unsaturated carboxylic acids or their anhydrides and polyvalent saturated and unsaturated amino alcohols, diamines, polyamines or mixtures thereof.

Polyhydroxyl compounds already containing urethane or urea groups and modified or unmodified natural polyols such as castor oil, carbohydrates or starch may also be used. Addition products of alkylene oxides and phenol formaldehyde resins or alkylene oxides and urea formaldehyde resins are also suitable for the purpose of the invention.

Representatives of these compounds which may be used according to the invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54, and Volume II, 1964, pages 5–6 and 198–199 as well as in Kunststoff-Handbuch, Volume VII, Vieweg-Hochtlen, Carl-Hanser-Verlag Munich, 1966, e.g. on pages 45–71.

Vinyl polymers with hydroxyl groups may also be used as reactants for the triisocyanates according to the invention. By these vinyl polymers are meant the known products which constitute copolymers of ethylenically unsaturated monomers containing hydroxyl groups and other ethylenically unsaturated compounds, e.g. ethylenically unsaturated esters and hydrocarbons. Particular examples include copolymers which contain the following hydroxyl monomers: Monohydroxy and polyhydroxy alkyl maleates and fumarates such as hydroxyethyl fumarate and the like, acrylates and methacrylates with hydroxyl groups, such as trimethylolpropane monomethacrylate, 2-hydroxyethyl acrylate and 2-hydroxy methacrylate, 2(or 3)-hydroxypropyl acrylate and methacrylate, 4-hydroxybutyl acrylate and methacrylate and hydroxyvinyl compounds such as hydroxyethyl vinyl ether and allyl alcohol.

Suitable comonomers for preparation of the above mentioned copolymers include e.g. methyl methacrylate; ethyl methacrylate, propyl methacrylate, butyl methacrylate, amyl methacrylate, hexyl methacrylate, heptyl methacrylate, octyl methacrylate, decyl methacrylate, methylcrotonate and ethyl crotonate; Methyl acrylate, ethyl acrylate, propyl acrylate, isopropyl acrylate, butyl acrylate, isobutyl acrylate, amyl acrylate, hexyl acrylate, 2-ethyl-hexylacrylate, heptyl acrylate, octyl acrylate, 3,5,5-trimethyl-hexyl acrylate, decyl acrylate, and dodecyl acrylate; dimethylmaleate, diethylmaleate, diallylmaleate, dimethylfumarate, diethylfumarate, dimethylallylfumarate, diethylglutaconate and the like; Isopropenylacetate, isopropenylpropionate, isopropenylbutyrate, isopropenylisobutyrate, isopropenylvalerate, isopropenylcaproate, isopropenyloenanthate, isopropenylbenzoate, isopropenyl-p-chlorobenzoate, isopropenyl-o-chlorobenzoate, isopropenyl-o-bromobenzoate, isopropenyl-m-chlorobenzoate, isopropenyl methylbenzoate, isopropenyl-α-chloroacetate and isopropenyl-α-bromopropionate; Allyl esters such as allyl chloride, allyl cyanide, allyl bromide, allylfluoride, allyl iodide, allyl chlorocarbonate, allyl thiocyanate, allyl formate, allyl acetate, allyl propionate, allyl butyrate, allyl valerate, allyl caproate, allyl-3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl acetate, allyl acetoacetate, and allylthioacetate; also methallyl esters corresponding to the above allyl esters and esters of alkenyl alcohols such as β-ethylallyl alcohol, β-propylallyl alcohol, 1-buten-4-ol, 2-methyl-butenol-(4), 2-(2,2-dimethylpropyl)-1-buten-4-ol and 1-penten-4-ol.

The preferred comonomers are esters of organic acids having from 2 to 20 carbon atoms, in particular esters of acrylic and methacrylic acid, e.g. methyl methacrylate, ethyl methacrylate, propyl methacrylate, butyl methacrylate, methyl acrylate, ethyl acrylate, propyl acrylate and butyl acrylate.

Other compounds which may also be added as comonomers include monoolefinic hydrocarbons and chlorohydrocarbons such as styrene, α-methylstyrene or α-chlorostyrene and monoolefinic nitriles such as acrylonitrile and methacrylonitrile.

Polymers which contain acid groups and have been obtained by copolymerization of unsaturated acids such as maleic, acrylic or methacrylic acid may also be used in the lacquers.

When the new triisocyanates according to the invention or the corresponding masked triisocyanates are used in accordance with the invention in two-component polyurethane lacquers, they may be combined not only with the higher molecular weight polyhydroxyl compounds mentioned above but also with any low molecular weight polyols within the molecular weight range of from about 62 to 400. It is in many cases advisable to use mixtures of the aforesaid higher molecular weight polyhydroxyl compounds with low molecular weight polyhydroxyl compounds of this kind. The NCO/OH equivalent ratio in the two-component polyurethane lacquers is generally between about 0.8:1 and 1.2:1.

Suitable low molecular weight polyhydroxyl compounds within the molecular weight range given above include in particular diols and/or triols having aliphatically or cycloaliphatically bound hydroxyl groups, e.g. ethylene glycol, propane-1,2-diol, propane-1,3-diol, hexamethylene diol, trimethylolpropane, glycerol, trihydroxyhexanes, 1,2-dihydroxycyclohexane or 1,4-dihydroxycyclohexane. Low molecular weight polyols having ether groups, such as diethylene glycol, triethylene glycol, tetraethylene glycol, dipropylene glycol, tripropylene glycol or tetrapropylene glycol are also suitable.

In principle, any mixtures of the above mentioned polyhydroxyl compounds may be used provided the individual components are compatible with each other.

Lacquers which are prepared using, in accordance with the invention, the new triisocyanates or corresponding masked triisocyanates are particularly distinguished by the fact that they can be applied without solvent to give rise to lightfast coatings with excellent mechanical properties without forming bubbles.

When preparing the lacquer mixtures, it is generally unnecessary to add water absorbing or dehydrating agents. The lacquers according to the invention may be combined with pigments and fillers by apparatuses conventionally employed in the lacquer industry.

Other lacquer raw materials and/or auxiliary agents such as cellulose esters, levelling agents, plasticizers, silicone oils, resins and other substances conventionally used may, of course, also be added. The known catalysts may be used for adjusting the reactivity of the polyurethane lacquers. The lacquers may be applied to surfaces by any of the usual methods such as brush coating, spraying immersion, etc. They are particularly suitable for coating any substrates made of wood, metal, plastics or other materials.

The following hydroxyl polyesters, hydroxyl polyethers and hydroxyl polyacrylates are used in the examples given below:

Hydroxyl Compound I
  Polyester of 2 mols of isophthalic acid, 2 mols of phthalic acid, 3 mols of hexane-1,6-diol and 2 mols of trimethylolpropane (Hydroxyl number 170)
Hydroxyl Compound II
  Polyalkylene glycol of trimethylolpropane and propylene oxide (Hydroxyl content 11.5%)
Hydroxyl Compound III
  1:1 Mixture of an acrylate polymer of 22% hydroxyethyl methacrylate, 41.2% styrene, 24.8% butyl acrylate, 1% acrylic acid (Hydroxyl number 124) and a polyester of 3 mols of isophthalic acid, 1 mol of adipic acid, 4 mols of hexanediol and 1 mol of trimethylolpropane (hydroxyl number 140).

EXAMPLES

Example 1

1-Isocyanatomethyl-2-(3-isocyanatopropyl)-4 (or 5)-isocyanatomethyl-cyclohexane

Stage 1: 1-Cyano-2-(2-cyanoethyl)-4 (or 5)-formyl-cyclohexane 300 g (1.88 mol) of 1-cyano-2-(2-cyanoethyl)cyclohexene-4 are dissolved in 600 ml of toluene and hydroformylated with $CO/H_2$ (molar ratio 1:1) in the presence of 0.05% of $[(C_6H_5)_3P]_3RhCl_3$ for 4 hours in a refined steel stirrer autoclave at 170° C. and 200 to 250 bar. The reaction product is distilled in a high vacuum after evaporation of the solvent. 1-Cyano-2-(2-cyanoethyl)-4(or 5)-formyl-cyclohexane boiling at 178° C./0.18 T is obtained as a colorless, viscous liquid in a yield of 267 g (75%).

$n_D^{25}$: 1.5014.

Analysis: (Figures here and subsequently in all cases represent percentages by weight): Found: C 69.3, H 7.5, N 14.6, O 8.9. Theory: C 69.4, H 7.3, N 14.7, O 8.4.

Stage 2: Hydrogenation of the formyl product 200 g (1.05 mol) of 1-cyano-2-(2-cyanoethyl)-4(or 5)-formyl-cyclohexane are hydrogenated in the course of 4 hours at 120°–150° C. at a pressure range of 120–150 bar of hydrogen in 400 ml of tetrahydrofuran in the presence of 50 g of Raney cobalt catalyst, 300 ml of liquid ammonia and 3–4 ml of glacial acetic acid. The catalyst is then removed and the reaction solution distilled. 1-Aminomethyl-2-(3-aminopropyl)-4(or 5)-aminomethyl-cyclohexane boils at 129° C./0.13 T and is obtained as colorless liquid in a yield of 144 g (69%).

$n_D^{25}$: 1.5088.

Analysis: Found: C 66.2, H 12.4, N 20.9. Theory: C 66.3, H 12.5, N 21.1.

Stage 3: Preparation of isocyanate 140 g (0.7 mol) of 1-aminomethyl-2-(3-aminopropyl)-4(or 5)-aminomethyl-cyclohexane are dissolved in 1.5 liters of chlorobenzene in a 5-liter, three-necked flask and carbon dioxide is introduced until the reaction has been completed. The reaction mixture is then cooled to $-5°$ C. for phosgenation. About 180 g (1.8 mol) of phosgene are condensed into the cold suspension. The reaction mixture is then slowly heated to the boiling point of the solvent with continuous addition of phosgene. Phosgenation is continuously added until a clear solution is obtained. This solution is then freed from excess phosgene by flushing with nitrogen and concentrated by evaporation under vacuum. High vacuum distillation (0.1 Torr) yields 1-isocyanatomethyl-2-(3-isocyanatopropyl)-4(or 5)-isocyanatomethyl-cyclohexane at 172° C. as a pale, yellowish liquid with a viscosity of 80 cP (20° C.).

Yield: 138 g (71%).

$n_D^{25}$: 1.5122.

Analysis: Found: C, 60.4, H 6.9, N 14.9, O 18.0. Theory: C 60.6, H 6.9, N 15.2, O 17.3.

EXAMPLE 2

1-Isocyanatomethyl-1-(3-isocyanatopropyl)-3(or 4)-isocyanatomethyl-cyclohexane

Stage 1: 1-Cyano-1-(2-cyanoethyl)-3(or 4)-formyl cyclohexane 300 g (1.88 mol) of 1-cyano-1-(2-cyanoethyl)-cyclohexene-3 are hydroformylated in 600 ml of toluene by the method indicated in Example 1. 1-Cyano-1-(2-cyanoethyl)-3(or 4)-formyl-cyclohexane boiling at 166° to 168° C./0.15 T is obtained from the reaction mixture as a colorless, viscous liquid in a yield of 310 g (87%).

$n_D^{25}$: 1.4962.

Analysis: Found: C 69.2, H 7.8, N 14.7, O 9.1. Theory: C 69.4, H 7.3, N 14.7, O 8.4.

Stage 2: Hydrogenation of the formyl product 200 g (1.05 mol) of 1-cyano-1-(2-cyanoethyl)-3-(or 4)-formyl-cyclohexane are hydrogenated in 400 ml of dioxane in the presence of catalyst, liquid ammonia and glacial acetic acid by the method indicated in Example 1 (Stage 2).

The reaction mixture is worked up in the usual manner. 1-aminomethyl-1-(3-aminopropyl)-3-(or 4)-aminomethyl-cyclohexane boiling at 115° to 117° C./0.09 T or R being obtained as a colorless liquid in a yield of 150 g (72%).

$n_D^{25}$: 1.5076.

Analysis: Found: C 66.3, H 12.6, N 21.2. Theory: C 66.3, H 12.5, N 21.1.

Stage 3: Preparation of isocyanate 150 g (0.75 mol) of 1-aminomethyl-1-(3-aminopropyl)-3 (or 4)-aminomethyl-cyclohexane are dissolved in 1.5 liters of chlorobenzene in a three-necked flask and carbon dioxide is introduced while the solvent is at boiling point until the reaction has been completed. The reaction mixture is then cooled to −5° C. for phosgenation. About 180 g (1.8 mol) of phosgene are condensed into the cold suspension. The reaction mixture is then slowly heated to the boiling point of the solvent while phosgene is continuously introduced. Phosgenation is continued until a clear solution is obtained. This solution is freed from excess phosgene by flushing with nitrogen and then concentrated by evaporation under vacuum. High vacuum distillation yields 1-isocyanatomethyl-1-(3-isocyanatopropyl)-3(or 4)-isocyanatomethyl-cyclohexane as a pale, yellowish liquid boiling at 166° to 168° C./0.2 T or R in a yield of 157 g (75%).

$n_D^{25}$: 1.5142.

Viscosity: 70 cP (20° C.).

Analysis: Found: C 60.5, H 6.9, N 14.9, O 16.8. Theory: C 60.6, H 6.9, N 15.2, O 17.3.

EXAMPLE 3

1-Isocyanatomethyl-1-(3-isocyanatopropyl)-3(or 4)-isocyanato-3 (or 4)-methyl-cyclohexane Stage 1: 1-Cyano-1-(2-cyanoethyl)-3(or 4)-amino-3(or 4)-methyl-cyclohexane 174 g (1.0 mol) of 1-cyano-1-(2-cyanoethyl)-3(or 4)-methyl-cyclohexene-3 are introduced dropwise into 270 g of 80% sulphuric acid and 300 ml of hydrogen cyanide. The reaction mixture is then heated under mild reflux of the hydrocyanic acid for 4 hours. Excess hydrogen cyanide is then distilled off. The reaction mixture is taken up with 900 ml of water and adjusted to pH 4 and 1-cyano-1-(2-cyanoethyl)-3(or 4)-methyl-3(or 4)-formamide-cyclohexane is separated off. Hydrolysis is carried out in dilute hydrochloric acid at 50° C. 1-Cyano-1-(2-cyanoethyl)-3 (or 4)-amino-3(or 4)-methyl-cyclohexane is extracted from alkaline medium with toluene and distilled at 138° C./0.14 T or R.

Yield: 92 g (48%).

$n_D^{25}$: 1.5434.

Analysis: Found: C 69.2, H 8.9, N 21.5. Theory: C 69.1, H 8.9, N 21.9.

Stage 2: Hydrogenation of the aminonitrile 160 g (0.84 mol) of 1-cyano-1-(2-cyanoethyl)-3(or 4)-amino-3(or 4)-methyl-cyclohexane are taken up in 500 ml of methanol and hydrogenated for 5 hours at 90° C./120 to 150 bar of hydrogen in the presence of 100 g of liquid ammonia and 30 g of Raney cobalt catalyst. After removal of the catalyst, 1-aminomethyl-1-(3-aminopropyl)-3(or 4)-amino-3(or 4)-methylcyclohexane is distilled in a high vacuum.

Bp: 125°-128° C./0.18 T; Yield: 123 g (74%).

$n_D^{25}$: 1.4936.

Analysis: Found: C 66.2, H 12.4, N 20.9. Theory: C 66.3, H 12.5, N 21.1.

Stage 3: Preparation of isocyanate 100 g (0.5 mol) of 1-aminomethyl-1-(3-aminopropyl)-3(or 4)-amino-3(or 4)-methyl-cyclohexane in 1.5 liters of boiling chlorobenzene are first converted into the carbamic acid derivative by addition of carbon dioxide and then phosgenated first in the cold and finally at boiling point in accordance with the methods indicated in Examples 1 and 2 (Stages 3). The isocyanate is obtained from the clear reaction solution by high vacuum distillation.

Bp: 152°-155° C./0.14 T or R; yield 95 g (68%); Viscosity 80 cP (20° C.).

Analysis: Found: C 60.4, H 6.8, N 15.3, O 17.8. Theory: C 60.6, H 6.9, N 15.2, O 17.3.

EXAMPLE 4

This example and the following examples describe the preparation of low solvent two-component lacquers. The lacquer consists in each case of components A and B which are mixed together.

Component A

| | |
|---|---|
| Hydroxyl compound I (polyester) (70% in ethyl glycol acetate) | 100.0 parts by weight |
| Zinc octoate (10% in xylene) | 2.0 parts by weight |
| Polysiloxane - levelling agent (10% in xylene) | 1.0 parts by weight |
| Ethyl glycol acetate/butyl acetate (1:1) | 0.4 parts by weight |

Component B
Polyisocyanate from Example 1

Component A and Component B are mixed in proportions by weight of 103.4:30.1. The mixture has a workable life of 3 to 4 hours, a spray viscosity of 25 seconds in a DIN outflow cup 4 mm (DIN 53211) and a solids content of 72 percent by weight. The lacquer is sprayed on steel sheets and hardened at 80° C. and 120° C. It has the following properties:

| | | |
|---|---|---|
| Thickness of layer | 50 | μ |
| Erichsen cupping (DIN 53156) | 10.1 | mm |
| Pendulum hardness (DIN 53157) | | |
| after 30 minutes at 80° C | 30 | seconds |
| after 30 minutes at 120° C | 189 | seconds |
| after ageing (60° C, 48 hours) | 201 | seconds |
| Grid section (DIN 53151) | 0 | seconds |

The lacquer film also shows high solvent resistance to toluene, ethyl glycol acetate, ethyl acetate and acetone.

EXAMPLE 5

Component A

| | |
|---|---|
| Hydroxyl compound III (polyacrylate) (80% in xylene/butyl acetate (1:1) | 100.0 parts by weight |
| Zinc octoate (10% in xylene) | 2.0 parts by weight |
| Polysiloxane levelling agent (10% in xylene) | 1.0 parts by weight |
| Ethyl glycol acetate/butyl acetate 1 : 1 | 10.1 parts by weight |

Component B

Polyisocyanate from Example 2

Component A and Component B are mixed together in proportions by weight of 113.1:19.3. The mixture has a viscosity of 25 seconds in a 4 mm DIN cup (according to DIN 53211) at a solids content of 70% by weight. The lacquer is sprayed on car body panels and the coats obtained are found to have the following properties:

| Thickness of layer | 45 | μ |
| --- | --- | --- |
| Erichsen cupping (DIN 53156) | 10.0 | mm |
| Pendulum hardness (DIN 53157) | | |
| after 30 minutes at 80° C | 37 | seconds |
| after 30 minutes at 120° C | 167 | seconds |
| after ageing (48 hours, 60° C) | 174 | seconds |
| Grid section (DIN 53151) | 0 | seconds |

The solvent resistance to the solvents mentioned in Example 4 is again excellent and the lacquer is therefore particularly suitable for car body repair work.

EXAMPLE 6

This example differs from Example 5 in that a different diol component is used, i.e., hydroxyl compound II, but the polyisocyanate is the same Component A

| Hydroxyl compound II (polyether) | 100.0 parts by weight |
| --- | --- |
| Zinc octoate (10% in xylene) | 3.4 parts by weight |
| Polysiloxane levelling agent (10% in xylene) | 1.7 parts by weight |
| Ethyl glycol acetate/butyl acetate 1 : 1 | 51.3 parts by weight |

Component B
Polyisocyanate from Example 2

Components A and B are mixed together in proportions by weight of 156.4:69.2. The mixture has a viscosity of 25 seconds in a 4 mm DIN cup (according to DIN 53211) at a solids content of 80% by weight. The lacquer is sprayed on steel sheet and the film obtained is found to have the following properties:

| Thickness of layer | 50 | μ |
| --- | --- | --- |
| Erichsen cupping (DIN 53156) | 10.0 | mm |
| Pendulum hardness (DIN 53157) | | |
| after 30 minutes at 80° C | 20 | seconds |
| after ageing (60° C, 48 hours) | 43 | seconds |
| Grid section (DIN 53151) | 0 | |

The two component polyurethane lacquers prepared in Examples 4, 5 and 6 can be applied with the usual spray devices.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Triisocyanates of the formula

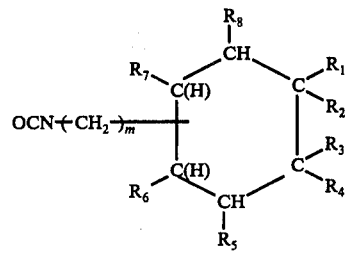

in which $R_1$, $R_2$, $R_3$ and $R_4$, which may be the same or different, represent hydrogen, a methyl group or the group—$(CH_2)_n$—NCO where $n$ represents an integer of from 1 to 3 and two of the groups represented by $R_1$, $R_2$, $R_3$ or $R_4$ are —$(CH_2)_n$—NCO groups; $m$ represents 0, 1 or 2; and $R_5$, $R_6$, $R_7$ and $R_8$, which may be the same or different, represent hydrogen or a methyl group, the total number of methyl groups represented by $R_5$, $R_6$, $R_7$ and $R_8$ being limited to a maximum of 2.

2. Process for the preparation of triisocyanates according to claim 1 comprising subjecting the triamines of the formula

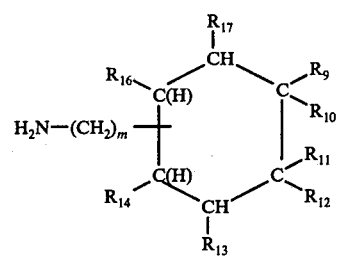

to a phosgenation reaction, in which formula $R_9$, $R_{10}$, $R_{11}$ and $R_{12}$, which may be the same or different, represent hydrogen, a methyl group or the group—$(CH_2)_n$—$NH_2$ where $n$ represents an integer of from 1 to 3 and two of the groups represented by $R_9$, $R_{10}$, $R_{11}$ and $R_{12}$ are —$(CH_2)_n$—$NH_2$ groups; $m$ represents 0, 1 or 2; and $R_{13}$, $R_{14}$, $R_{16}$ and $R_{17}$, which are the same or different, represent hydrogen or a methyl group, the total number of methyl groups represented by $R_{13}$, $R_{14}$, $R_{16}$ and $R_{17}$ being limited to a maximum of 2.

3. In an isocyanate polyaddition process for the production of polyurethane resins, the improvement comprising reacting compounds having a molecular weight of from about 400 to 10,000 which contain at least two hydrogen atoms capable of reacting with isocyanate groups and the triisocyanates of claim 1.

4. The process of claim 3 wherein the compounds which contain at least two hydrogen atoms capable of reacting with isocyanate groups are polyhydroxyl compounds having from 2 to 8 hydroxyl groups and having a molecular weight of from about 800 to 10,000.

5. The process of claim 4 wherein the polyhydroxyl compounds are selected from the group consisting of polyesters polyethers, polythioethers, polyacetals, polycarbonates, polyester amides and vinyl copolymers.

6. The process of claim 3 wherein polyols having a molecular weight of from about 62 to 400 are reacted in combination with the compounds having a molecular weight of from about 400 to 10,000.

7. The process of claim 4 wherein the NCO/OH equivalent ratio is between about 0.8:1 and 1.2:1.

* * * * *